US011801909B2

(12) United States Patent
Ledingham et al.

(10) Patent No.: US 11,801,909 B2
(45) Date of Patent: Oct. 31, 2023

(54) MULTIPURPOSE VEHICLE

(71) Applicant: Yuba International, Inc., Dover, DE (US)

(72) Inventors: Duncan Ledingham, Annecy-le-Vieux (FR); Timothy de la Fuente, Santa Rosa, CA (US); Benjamin Sarrazin, Wilmington, NC (US)

(73) Assignee: Yuba International, Inc., Dover, DE (US)

( * ) Notice: Subject to any disclaimer, the term of this patent is extended or adjusted under 35 U.S.C. 154(b) by 293 days.

(21) Appl. No.: 17/376,362

(22) Filed: Jul. 15, 2021

(65) Prior Publication Data

US 2021/0339813 A1 Nov. 4, 2021

Related U.S. Application Data

(60) Provisional application No. 63/053,133, filed on Jul. 17, 2020.

(51) Int. Cl.
*B62J 9/24* (2020.01)
*B62J 9/23* (2020.01)

(52) U.S. Cl.
CPC .. *B62J 9/23* (2020.02); *B62J 9/24* (2020.02)

(58) Field of Classification Search
CPC ......... B62J 7/02; B62J 7/04; B62J 9/21; B62J 9/23; B62J 9/24; B62J 9/27
See application file for complete search history.

(56) References Cited

U.S. PATENT DOCUMENTS

| 3,934,770 A * | 1/1976 | Larsen | B62J 9/23 224/434 |
| 4,662,548 A * | 5/1987 | Jackson | B62J 9/23 224/438 |
| 5,687,894 A * | 11/1997 | Cavallaro | B62J 7/04 224/457 |
| 2010/0224662 A1* | 9/2010 | Crum, Jr. | B62J 7/04 224/430 |
| 2018/0339740 A1* | 11/2018 | Getchell | B62J 7/04 |
| 2022/0041238 A1* | 2/2022 | Uimonen | B62J 9/23 |

* cited by examiner

*Primary Examiner* — Corey N Skurdal
(74) *Attorney, Agent, or Firm* — William H. Eilberg

(57) ABSTRACT

Presented is a multipurpose vehicle capable of being used by a user for travelling related purposes. The multipurpose vehicle comprises a vehicle frame comprising a vehicle rack and a plurality of connector portions, a plurality of swing arms, a plurality of lever arms, a plurality of hinge arms, a plurality of wing board(s) and a plurality of side boards. Each lever arm comprises a connector arrangement for removably connecting the lever arm to the vehicle rack. A handle is connected to a connector portion of the vehicle frame and the handle is manually operable to enable adjustment of the rotation of at least two swing arm(s). The multipurpose vehicle could be positioned in multiple operating modes by operating at least one of the handle and/or connector arrangement(s).

17 Claims, 10 Drawing Sheets

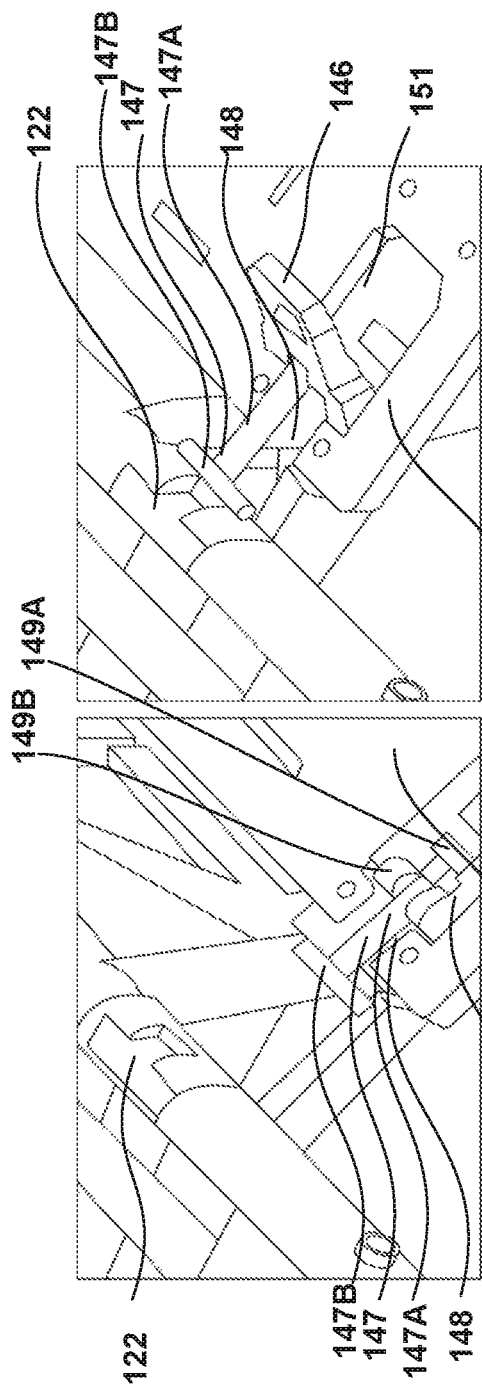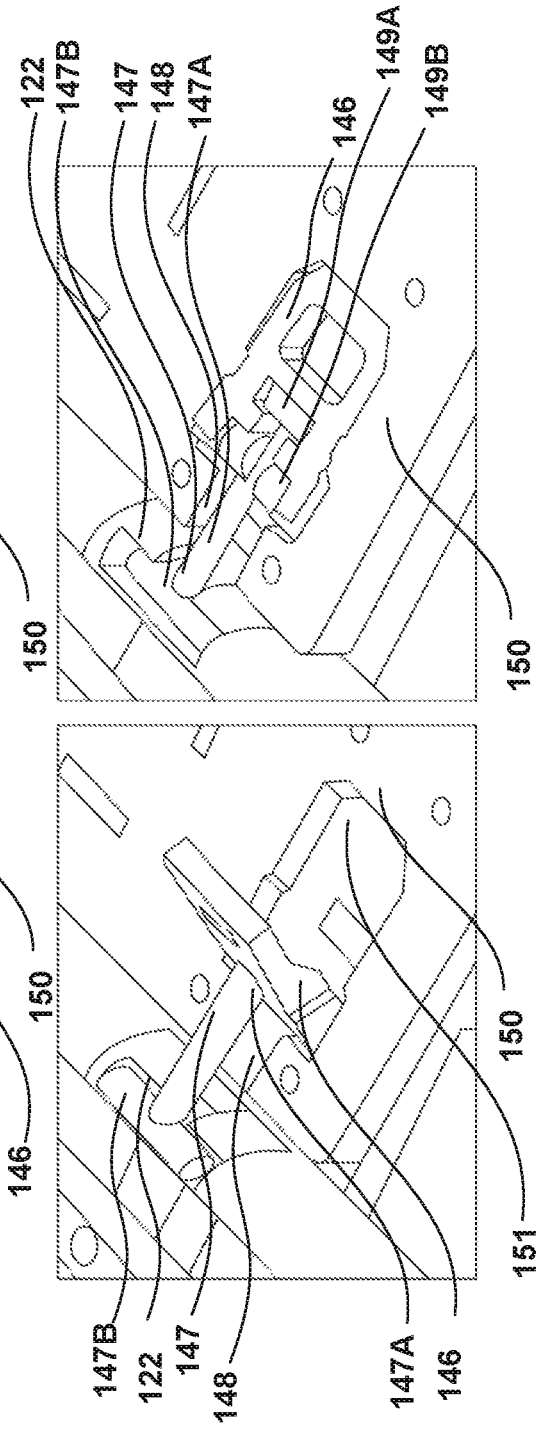

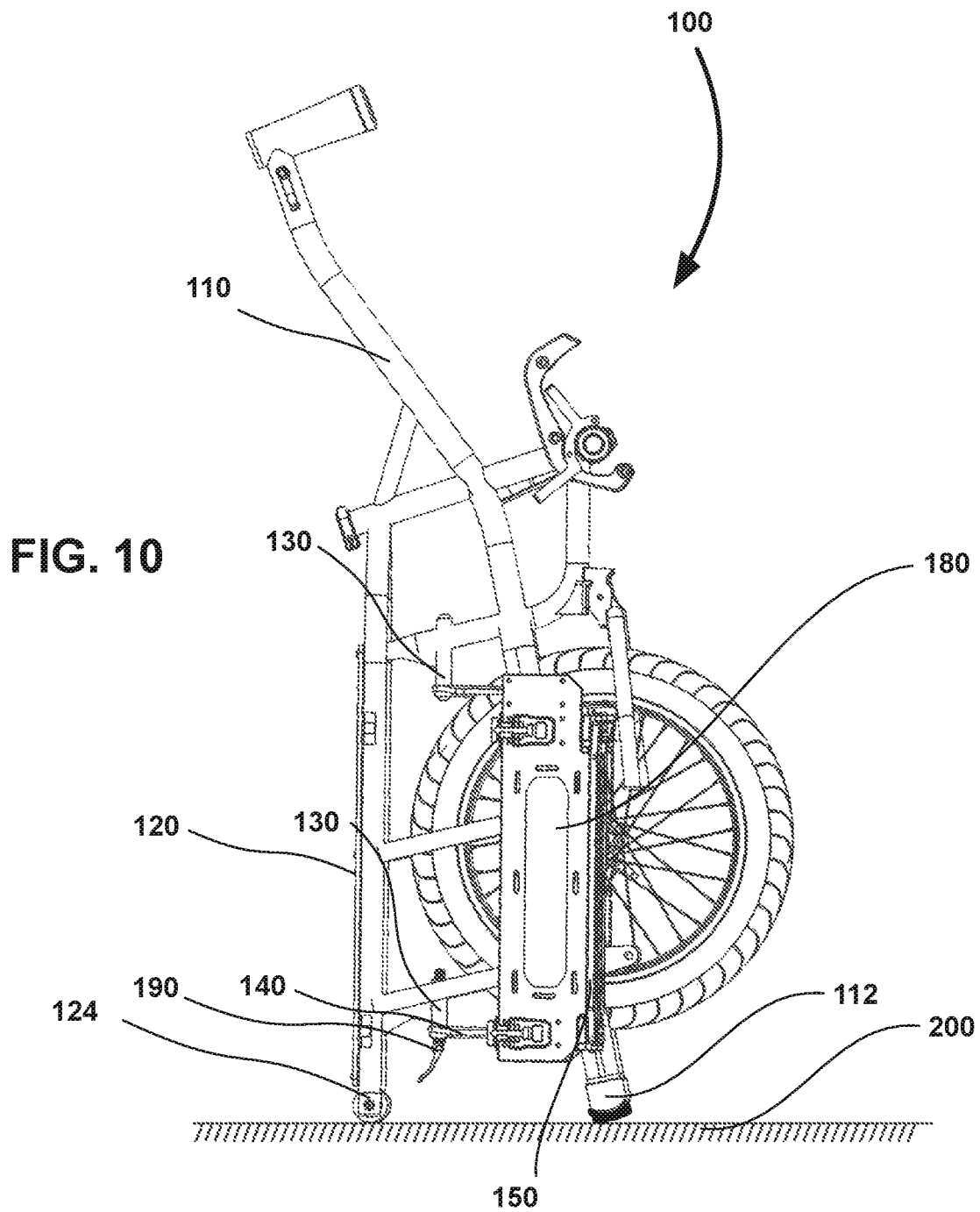

MULTIPURPOSE VEHICLE

CROSS-REFERENCE TO RELATED PATENT DOCUMENTS

This patent application claims the benefit of priority of U.S. Provisional Application No. 63/053,133, entitled "URBAN BICYCLE," filed 17 Jul. 2020, which are hereby incorporated herein by reference in its entirety.

TECHNICAL FIELD OF INVENTION

The present invention generally relates to a multipurpose vehicle such that a user can transform the functional shape of the multipurpose vehicle to suit his/her requirements.

BACKGROUND

Bicycles are used by public to meet a variety of needs. Generally, Bicycles are used as a source of transportation by daily commuters such as students, as exercise equipment for fitness purposes, a recreational activity equipment for adventure purposes and a sports equipment for sportspersons all around the world. Generally, a bicycle is driven by paddling the foot pedals while the user is holding the handle of the bicycle. A user typically carries a backpack on his shoulders while riding the bicycle. Further, the user can attach the luggage such as but not limited to: groceries, books, cargo, bags on the rear rack of the bicycle. Further, a user can carry a person on the rear seat of the bicycle and the person sitting on the rear seat can place their feet on the footrest of the bicycle.

Carrying luggage on the bicycle possesses few problems. Generally, luggage is removably secured to the rack of the vehicle. However, racks have a limited range of adjustability and can only support a few varieties of luggage types. Further, Generally, racks are designed to support a single luggage type for example backpack and so on and if a user intends to carry a bigger luggage for example suitcase, he/she would have trouble in securing luggage to the rack of the bicycle.

Many attempts to provide solutions to some of the problems discussed hereinabove may be found in the prior art, such as for example: U.S. Pat. No. 3,873,127A discloses a multi-purpose rack for bicycles which is designed for mounting directly behind the bicycle seat and over the rear wheel. The rack may be fully extended in a horizontal position for providing an enlarged space for carrying books, lunch pails, brief cases and the like. The rearward portion of the rack may be raised to a substantially vertical position and latched in place to form a rear buddy seat, or the rack may be fully extended in a substantially upright position for securing thereto and carrying an ordinary back pack commonly used for hiking and the like.

These and other existing solutions providing multipurpose rear loaders have proven to be operationally cumbersome and are unreliable. Further, these prior art devices do not provide a multipurpose rear loader that can be selectively and easily positioned in multiple operating modes.

In the light of foregoing, there is a need of a relatively simple, easy to use, multipurpose, and inexpensive solution that would allow the user to transform the functional shape of the rear loader to suit his/her requirements. Thus, a multipurpose vehicle solving the aforementioned problems is desired.

BRIEF SUMMARY

Before the present systems and methods, enablement are described, it is to be understood that this application is not limited to the particular systems, and methodologies described, as there can be multiple possible embodiments which are not expressly illustrated in the present disclosures. It is also to be understood that the terminology used in the description is for the purpose of describing the particular versions or embodiments only, and is not intended to limit the scope of the present application.

It is an object of the present invention to provide a multipurpose vehicle that is used for carrying a variety of luggage.

It is an object of the present invention to provide a multipurpose vehicle that is used for carrying people on the back of the multipurpose vehicle.

It is an object of the present invention to provide a multipurpose vehicle that allows the user to easily transform the functional shape of the multipurpose vehicle in multiple operational modes.

It is an object of the present invention to provide a multipurpose vehicle that can be stored in a substantially vertical position to occupy less space.

It is an object of the present invention to provide a vehicle rack comprises a plurality of ports for removably connecting vehicle accessories.

It is an object of the present invention to provide a connector arrangement capable of removably connecting the lever arm and/or wing board to the vehicle rack without requiring any special tools.

It is an object of the present invention to provide a multipurpose vehicle that allows the user to select a specific mode of multipurpose vehicle selected from: compact mode, side loader mode, carry on mode and flat bed mode.

Embodiments of the present invention disclose a multipurpose vehicle capable of being used by a user for travelling across various places. The multipurpose vehicle comprises a front portion and a rear portion (rear loader). The front portion of the multipurpose vehicle comprises various parts such as but not limited to: wheels, frame, tubes, handles, vehicle stand, seats, brakes and so on. The rear portion of the multipurpose vehicle comprises a vehicle frame including a vehicle rack and a plurality of connector portions. The rear portion of the multipurpose vehicle further comprises a plurality of swing arms. Each swing arm comprises a first end and an opposite second end, wherein the first end of two swing arms are rotatably connected to a connector portion of the vehicle frame. The second end of each swing arm is connected to a lever arm. The multipurpose vehicle further comprises a plurality of wing boards wherein each wing board is connected to two lever arms. Each lever arm further comprises a connector arrangement for removably connecting the lever arm to the vehicle rack. The multipurpose vehicle further comprises a plurality of hinge arms wherein each hinge arm is rotatably connected to the lever arm by a pivoting means. The multipurpose vehicle further comprises a plurality of side boards wherein each side board is connected to two hinge arms.

A handle is connected to first end of two swing arms wherein the handle is manually operable to enable adjustment of the rotation of at least two swing arms. The handle has at least two positional settings. When the handle is operated in low positional setting (low mode), the swing arms are positioned such that the wing board is positioned below the vehicle rack. When the handle is operated in high positional setting (high mode), the swing arms are positioned such that the wing board and the vehicle rack are substantially at same height. The wing board(s) and/or the side board(s) of the multipurpose vehicle are configured to be positioned relative to the vehicle frame in multiple operating modes by operating at least one of handle and/or connector arrangement(s) which will be explained in greater detail in the below description. The multiple operating modes of the multi-purpose vehicle are selected by the user and the multiple operating modes could be one of following: side loader mode, compact mode, carry on mode and flat bed mode.

Embodiments of the present invention disclose a vehicle frame which provides structural rigidity to the multi-purpose vehicle. The vehicle frame permits various components such as but not limited to wheels, handle, seat(s), pedals brakes and so on to be mounted to the multipurpose vehicle.

In an embodiment, the vehicle frame comprises a pair of stand up feet portion for vertical parking of the multipurpose vehicle.

In an embodiment, the vehicle rack comprises a plurality of T bar slots for removably connecting the lever arm and/or wing board to the vehicle rack.

In an embodiment, the vehicle rack comprises a pair of stand-up wheels for vertical parking of the multipurpose vehicle.

In an embodiment, the vehicle rack comprises a plurality of ports for removably connecting accessory seats.

In an embodiment, the wing board and the side board comprises a plurality of elongate projections and a plurality of elongate slots respectively for proper mating of the side board and the wing board.

In an embodiment, the side board comprises a plurality of cushion pads for anti-rattle effect and/or better grip.

Various objects, features, aspects and advantages of the present invention will become more apparent from the following detailed description of the embodiments of the invention, along with the accompanying drawings in which like numerals represent like components.

BRIEF DESCRIPTION OF THE DRAWINGS

The foregoing summary, as well as the following detailed description of preferred embodiments, is better understood when read in conjunction with the appended drawings. There is shown in the drawings example embodiments, however, the application is not limited to the specific system and method disclosed in the drawings.

FIG. 9A-FIG. 9D illustrates various steps/procedures for connecting wing board and/or lever arm to the vehicle rack of the multipurpose vehicle of FIG. 1-FIG. 8, according to an embodiment of the present invention; and FIG. 10 illustrates a side view of the multipurpose vehicle of FIG. 1 in vertical parking mode wherein the multipurpose vehicle is resting on the ground surface.

DETAILED DESCRIPTION

Figure 1:
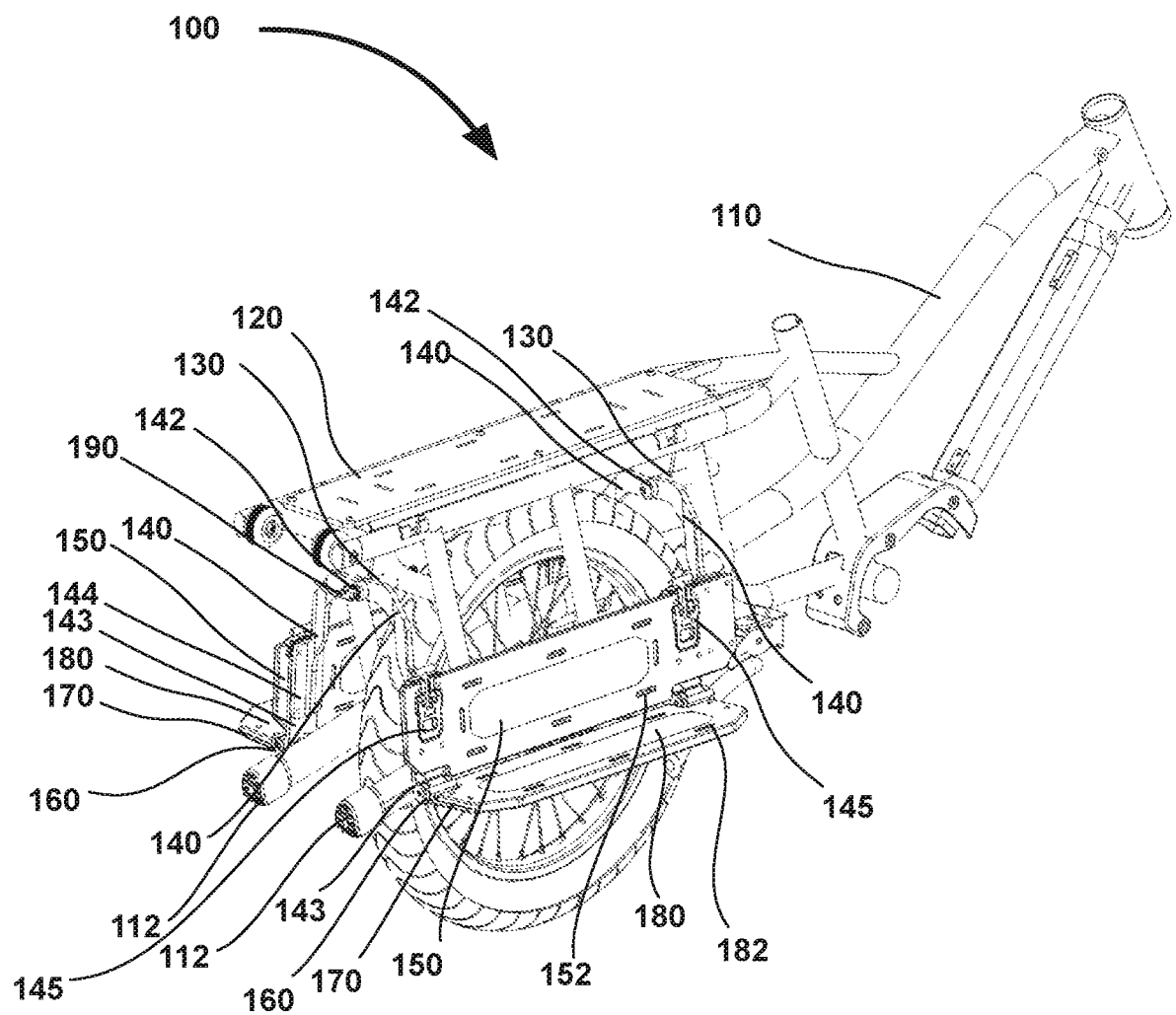
FIG. 1 illustrates a perspective view of a rear portion of a multipurpose vehicle in the side loader mode, according to an embodiment of the present invention.

Some embodiments, illustrating its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any methods, and systems similar or equivalent to those described herein can be used in the practice or testing of embodiments, the preferred methods, and systems are now described. The disclosed embodiments are merely exemplary.

The various features and embodiments of an exercising apparatus of the present invention will now be described in conjunction with the accompanying figures, namely FIGS. 1-10.

Referring to accompanying figures, especially FIG. 1-FIG. 7, a multipurpose vehicle 100 is shown capable of being used by a user for travelling across various places, in accordance with an embodiment of present invention. The multipurpose vehicle 100 comprises a front portion and a rear portion (rear loader). The front portion of the multipurpose vehicle 100 comprises various parts such as but not limited to: wheels, frame, tubes, handles, seats, brakes and so on. The rear portion of the multipurpose vehicle 100 comprises a vehicle frame 110 including a vehicle rack 120 and a plurality of connector portions 130. The rear portion of the multipurpose vehicle 100 further comprises a plurality of swing arms 140. Each swing arm 140 comprises a first end 142 and an opposite second end 144, wherein the first end 142 of two swing arms 140 are rotatably connected to a connector portion 130 of the vehicle frame 110. The connector portion 130 includes but not limited to: bolt axle, pivot pin and so on. As shown in FIG. 1-FIG. 7, the first end 142 of two swing arms 140 is arranged at a common position. The second end 144 of each swing arm 140 is connected to a lever arm 143. The multipurpose vehicle 100 further comprises a plurality of wing boards 150 wherein each wing board 150 is connected to two lever arms 143. The connection between the wing board 150 and two lever arms 143 is achieved by any connection means including but not limited to: fasteners, welding, rivets, screws and so on. Each lever arm 143 further comprises a connector arrangement 145 for removably connecting the lever arm 143 to the vehicle rack 120. The multipurpose vehicle 100 further comprises a plurality of hinge arms 170 wherein each hinge arm 170 is rotatably connected to the lever arm 143 by a pivoting means 160 which will be explained in greater detail in below description. The multipurpose vehicle 100 further comprises a plurality of side boards 180 wherein each side board 180 is connected to two hinge arms 170. The connection between the side board 180 and two hinge arms 170 is achieved by any connection means including but not limited to: fasteners, welding, rivets, screws and so on.

A handle 190 is connected to first end 142 of two swing arms 140 wherein the handle 190 is manually operable to enable adjustment of the rotation of at least two swing arms 140. The handle 190 is further connected to a connector portion 130 of the vehicle frame 110. The handle includes 190 but not limited to: a lever handle, a knob, a twist handle, a pull push button, a manual switch and/or combination thereof. As shown in FIG. 1-FIG. 7, the handle 190 is a lever type handle.

The handle 190 has at least two positional settings. As shown in FIG. 1, when the handle 190 is operated in low positional setting (low mode), the swing arms 140 are positioned such that the wing board 150 is positioned below the vehicle rack 120 as further seen in FIG. 2. As shown in FIG. 6, when the handle 190 is operated in high positional setting (high mode), the swing arms 140 are positioned such that the wing board 150 and the vehicle rack 120 are substantially at same height. The wing board(s) 150 and/or the side board(s) 180 of the multipurpose vehicle 100 are configured to be positioned relative to the vehicle frame 110 in multiple operating modes by operating at least one of handle 190 and/or connector arrangement(s) 145 which will be explained in greater detail in the below description. The multiple operating modes of the multi-purpose vehicle 100 are selected by the user and the multiple operating modes could be one of following: side loader mode (FIG. 1), compact mode (FIG. 4), carry on mode (FIG. 5) and flat bed mode (FIG. 7) which will be explained in greater detail in the below description.

As shown in FIG. 1-FIG. 7, the multipurpose vehicle 100 comprises a pair of wing board 150 and a pair of side boards 180. A wing board 150 and a side board 180 are positioned on one side (left side) of the vehicle frame 110. Further, a wing board 150 and a side board 180 is positioned on other opposite side (right side) of the vehicle frame 110.

As shown in FIG. 1-FIG. 7, the handle 190 is connected to a connector portion 130 of the vehicle frame 110. The other (remaining) connecting portion 130 is not connected to the handle 190.

Figure 3:
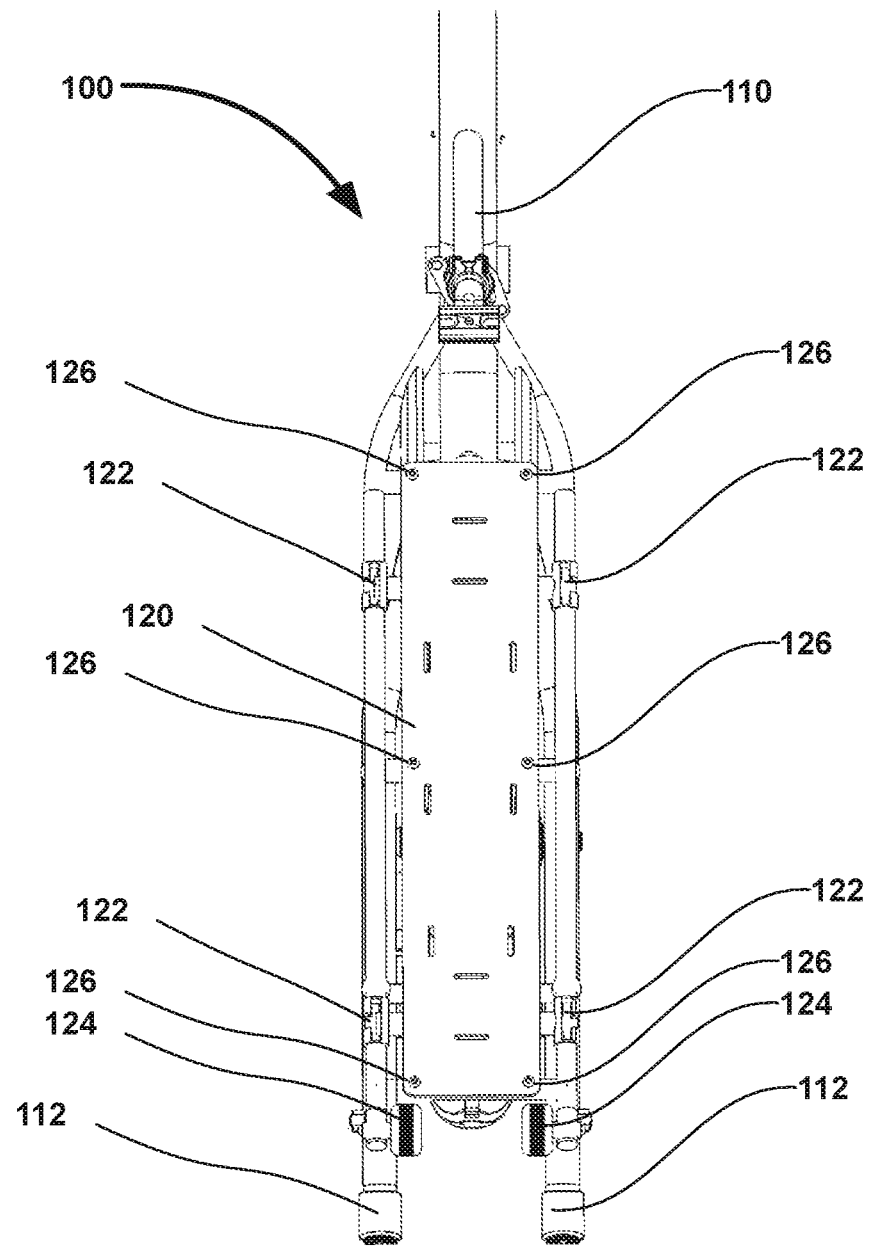
FIG. 3 illustrates a top plan view of the rear portion of the multipurpose vehicle of FIG. 1 with the side board and wing board removed for simplicity.

In an embodiment as shown in FIG. 3, a top plan view of the rear portion of the multipurpose vehicle 100 is shown with the side board and wing board removed from figure for simplicity. The vehicle rack 120 comprises a plurality of T bar slots 122 for removably connecting the lever arm 143 and/or wing board 150 (FIG. 1) to the vehicle rack 120. Further, the vehicle rack 120 comprises a pair of stand-up wheels 124 for enabling vertical parking of the multipurpose vehicle. Further, the vehicle rack 120 comprises a plurality of ports 126 for removably connecting vehicle accessories (not shown) such as but not limited to seats. Ports 126 can receive fasteners such as but not limited to bolts, keys and so on.

In an embodiment as shown in FIG. 1 and FIG. 3, the vehicle frame 110 comprises a pair of stand up feet portion 112 for vertical parking of the multipurpose vehicle 110 which will be explained in greater detail with reference to FIG. 10 in the below description.

As shown in FIG. 1, the multipurpose vehicle 100 is positioned in the side loader mode. In the side loader mode, the side board 180 and the wing board 150 are positioned substantially at an angle of 90 degrees apart i.e. perpendicular to each other. The side loader mode is useful for carrying people on the back of the multipurpose vehicle 100 such that a person can place his/her foot on the sideboard(s) 180 of the multipurpose vehicle 100. However, other uses of side loader mode is also possible and within the scope of the present invention.

Figure 4:
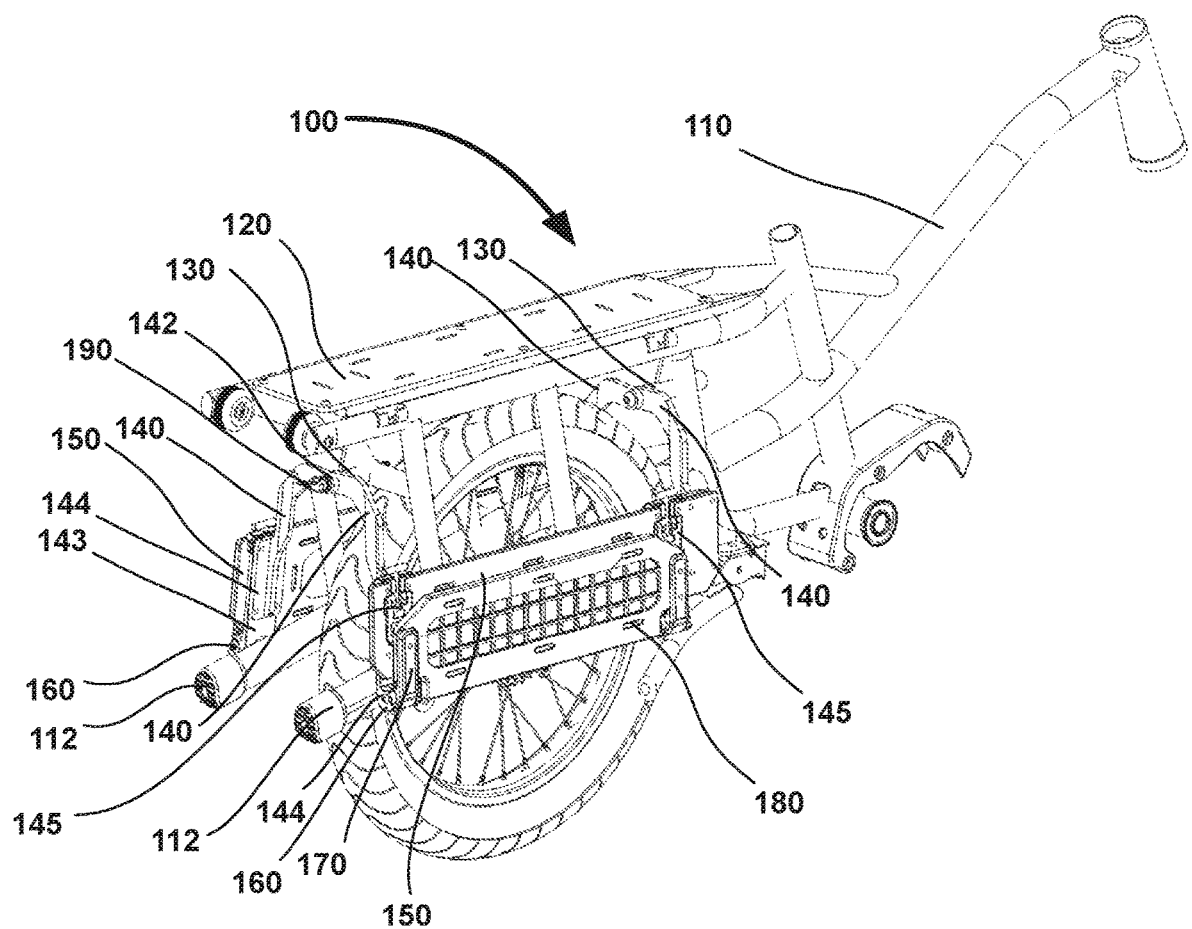
FIG. 4 illustrates a perspective view of a rear portion of a multipurpose vehicle in the compact mode wherein the wing boards are in vertical folded position, according to an embodiment of the present invention.

In an embodiment as shown in FIG. 1, the side board 180 comprises a plurality of elongate slots 182. Further, the wing board 150 comprises a plurality of elongate projections 152. The elongate slots 182 mates with elongate projections 152 for proper mating of the side board 180 and the wing board 150 when the multipurpose vehicle 100 is positioned in compact mode (FIG. 4).

In another embodiment (not shown in figures), the side board 180 comprises a plurality of cushion pads (not shown) for anti-rattle effect and/or better grip.

In another embodiment (not shown in figures), the swing arm 140 is integrally connected (formed) to a lever arm 143 to form a one-piece structure.

In another embodiment (not shown in figures), two lever arms 143 are integrally connected (formed) to a wing board 150 to form a one-piece structure.

In another embodiment (not shown in figures), the swing arm(s) 140, the lever arm(s) 143 and the wing board 150 are all integrally connected (formed) to form a one-piece structure.

In another embodiment (not shown in figures), two hinge arms 170 are integrally connected (formed) to a side board 180 to form a one-piece structure.

In another embodiment (not shown in figures), the Multipurpose vehicle 100 comprises more than two wing boards 150 and more than two side boards 180. At least two wing board 150 and at least two side boards 180 is positioned on one side (left side) of the vehicle frame 110. Further, at least two wing boards 150 and at least two side boards 180 is positioned on other opposite side (right side) of the vehicle frame 110.

In operation, when it is desired to position the multipurpose vehicle 100 in the compact mode as shown in FIG. 4, the hinge arm 170 is rotated relative to the lever arm 143 by using a pivoting means 160 which will be explained in greater detail in the below description. Each wing board 150 is connected to two lever arms 143 and each side board 180 is connected to two hinge arms 170. Therefore, the side board 180 rotates relative to the wing board 150 such that the side board 180 is substantially parallel relative to the wing board 150 in the compact mode. The compact mode occupies minimum space and is useful when no luggage carrying function/rear passenger carrying function is needed.

Figure 2:
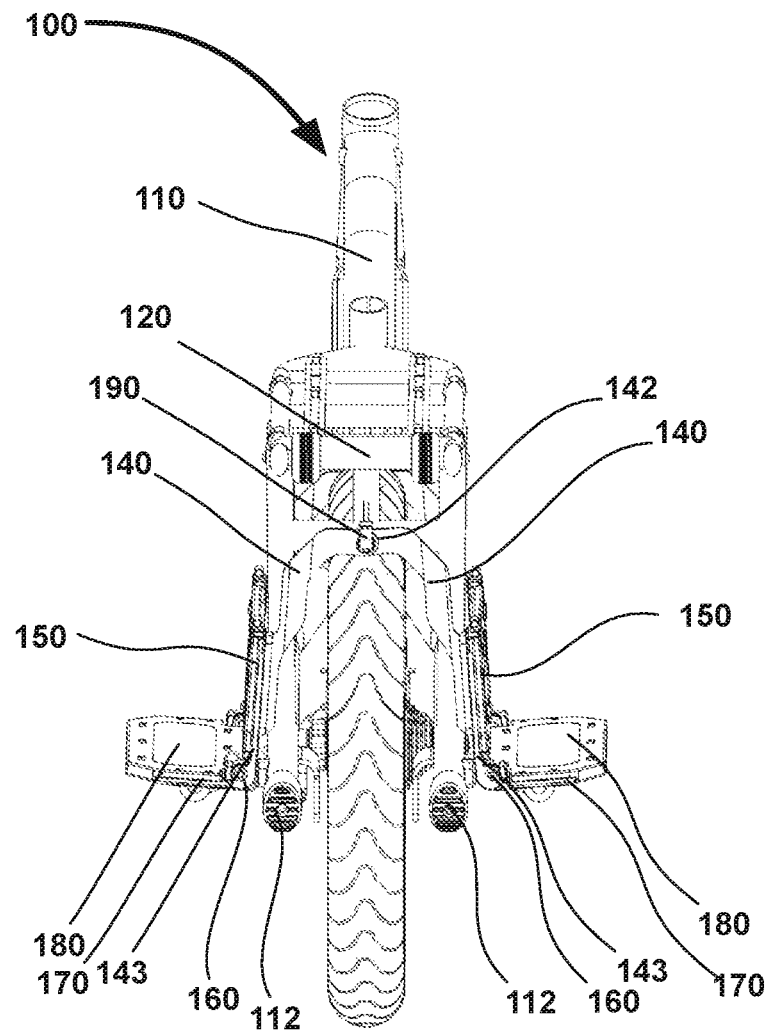
FIG. 2 illustrates rear view of the multipurpose vehicle of FIG. 1 in side loader mode.
Figure 5:
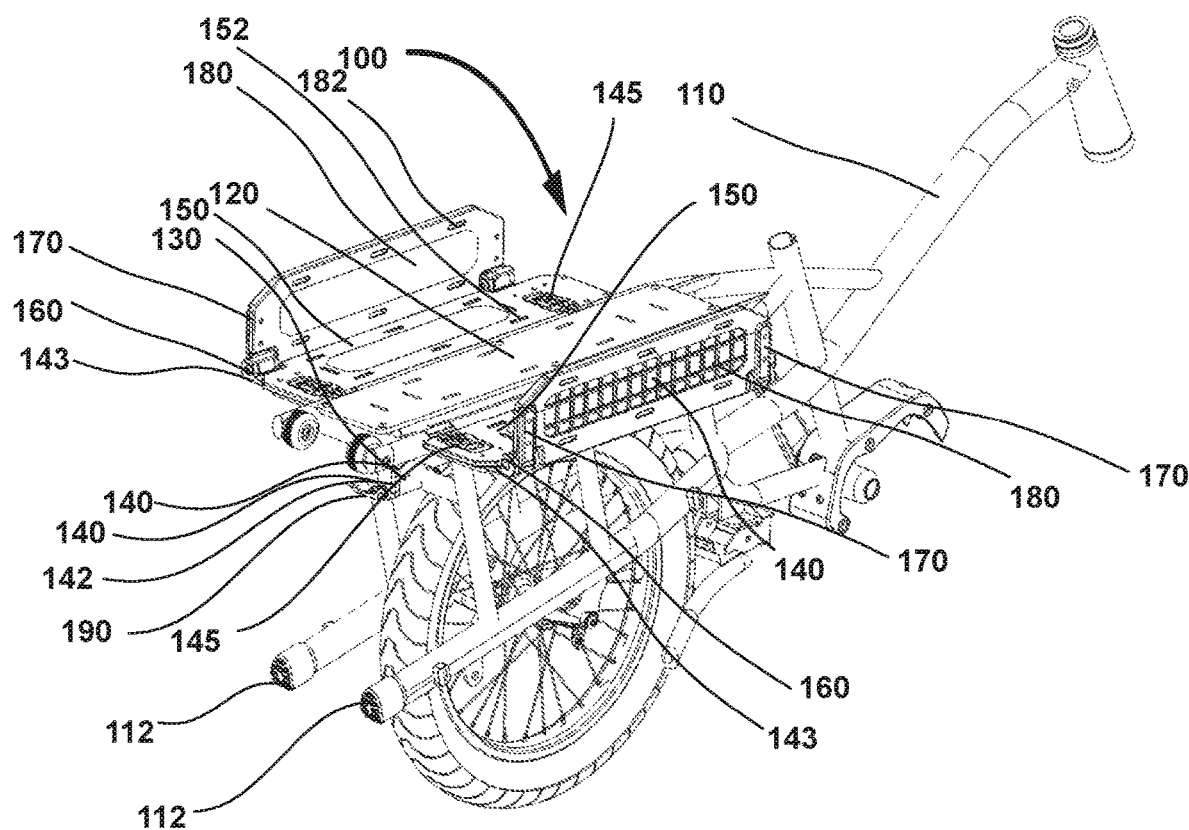
FIG. 5 illustrates a perspective view of a rear portion of a multipurpose vehicle in the carry on mode wherein the wing board is perpendicular to side board and swing arms are rotated by using a handle, according to an embodiment of the present invention.
Figure 6:
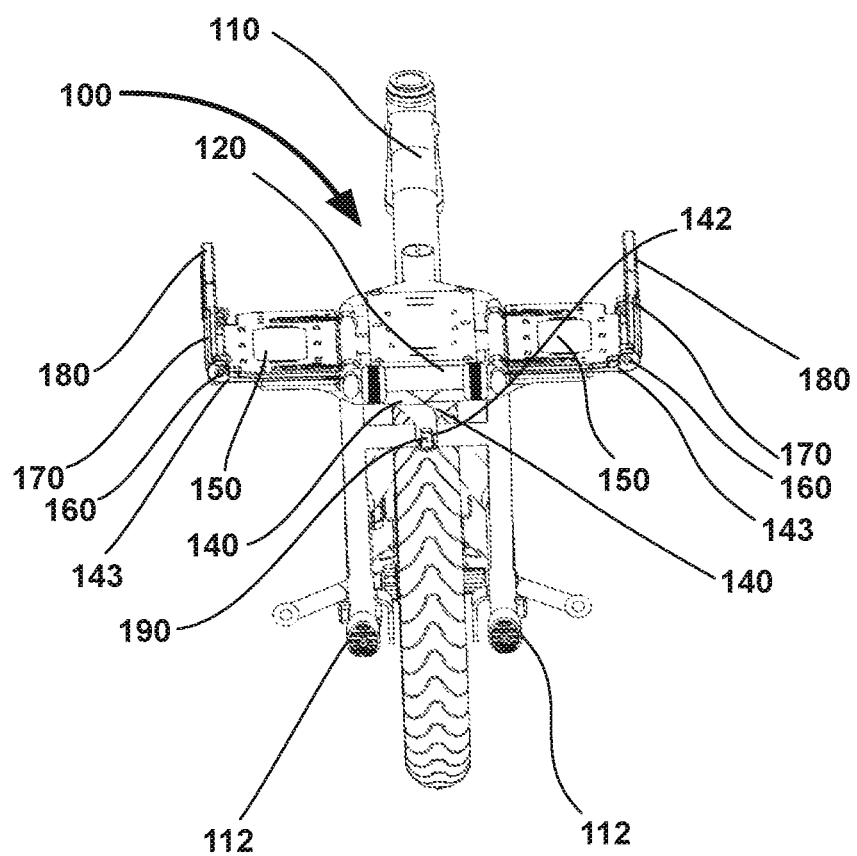
FIG. 6 illustrates rear view of the multipurpose vehicle of FIG. 5 in carry on mode.

In operation, when it is desired to position the multipurpose vehicle 100 in the carry on mode as shown in FIG. 5 and FIG. 6, the swing arms 140 are rotated by using a handle 190. A user operates the handle 190 manually in high positional setting (high mode), then the swing arms 140 are rotated by the user at an angle of 90 degrees in anti-clockwise direction when seen from the rear view of multipurpose vehicle 100 (FIG. 2 and FIG. 6). The second end 144 of each swing arm 140 is connected to a lever arm 143. Each wing board 150 is connected to two lever arms 143 and each side board 180 is connected to two hinge arms 170. Each lever arm 143 further comprises a connector arrangement 145 for removably connecting the lever arm 143 to the vehicle rack 120. After the swing arms 140 are rotated by using a handle 190, the lever arm 143 also rotates in the same direction. Afterwards, the lever arm 143 is connected to the vehicle rack 120 by using a connector arrangement 145 which will be described in greater detail in the below description. As seen in FIG. 5, the side board 180 is rotated relative to the wing board 150 using pivoting means 160 such that the side board 180 is substantially perpendicular (90 degrees) relative to the wing board 150 in the carry on mode. The carry on mode is useful for carrying luggage on the back of the multipurpose vehicle 100 that needs side retention. However, other uses of carry on mode are also possible and are within the scope of the present invention.

Figure 7:
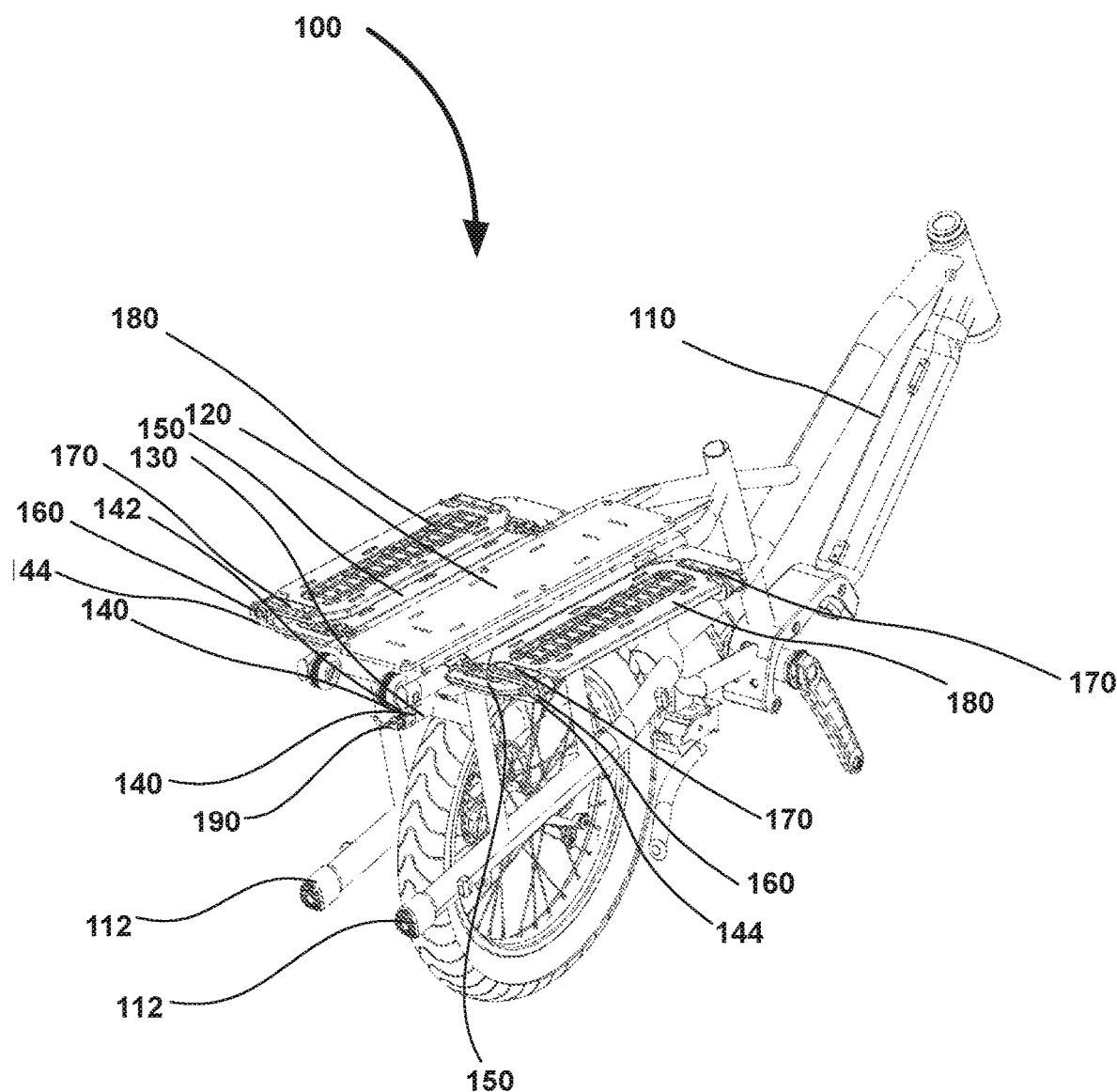
FIG. 7 illustrates a perspective view of a rear portion of the multipurpose vehicle in the flatbed mode wherein the wing board is parallel to side board, according to an embodiment of the present invention.

In operation, when it is desired to position the multipurpose vehicle 100 in the flatbed mode as shown in FIG. 7, the hinge arm 170 is rotated relative to the lever arm 143 by using a pivoting means 160. Each wing board 150 is connected to two lever arms 143 and each side board 180 is connected to two hinge arms 170. The side board 180 is rotated relative to the wing board 150 such that the side board 180 is substantially parallel relative to the wing board 150 in the flatbed mode. The flatbed mode is useful for carrying luggage on the back of the multipurpose vehicle 100 that has a wide surface area (dimensions) and may also slightly overhang outside the side board 180 and/or the wing board 150. Further, a rope/harness (not shown) could be used for tying the luggage securely placed on the side board 180 and/or the wing board 150. However, other uses of flatbed mode are also possible and is within the scope of the present invention.

It should be obvious to the one skilled in the art that various modes of the multipurpose vehicle 100 selected from the: side loader mode, compact mode, carry on mode and flat bed mode can be achieved by simply reversing the above steps with little or no variation.

Figure 8:
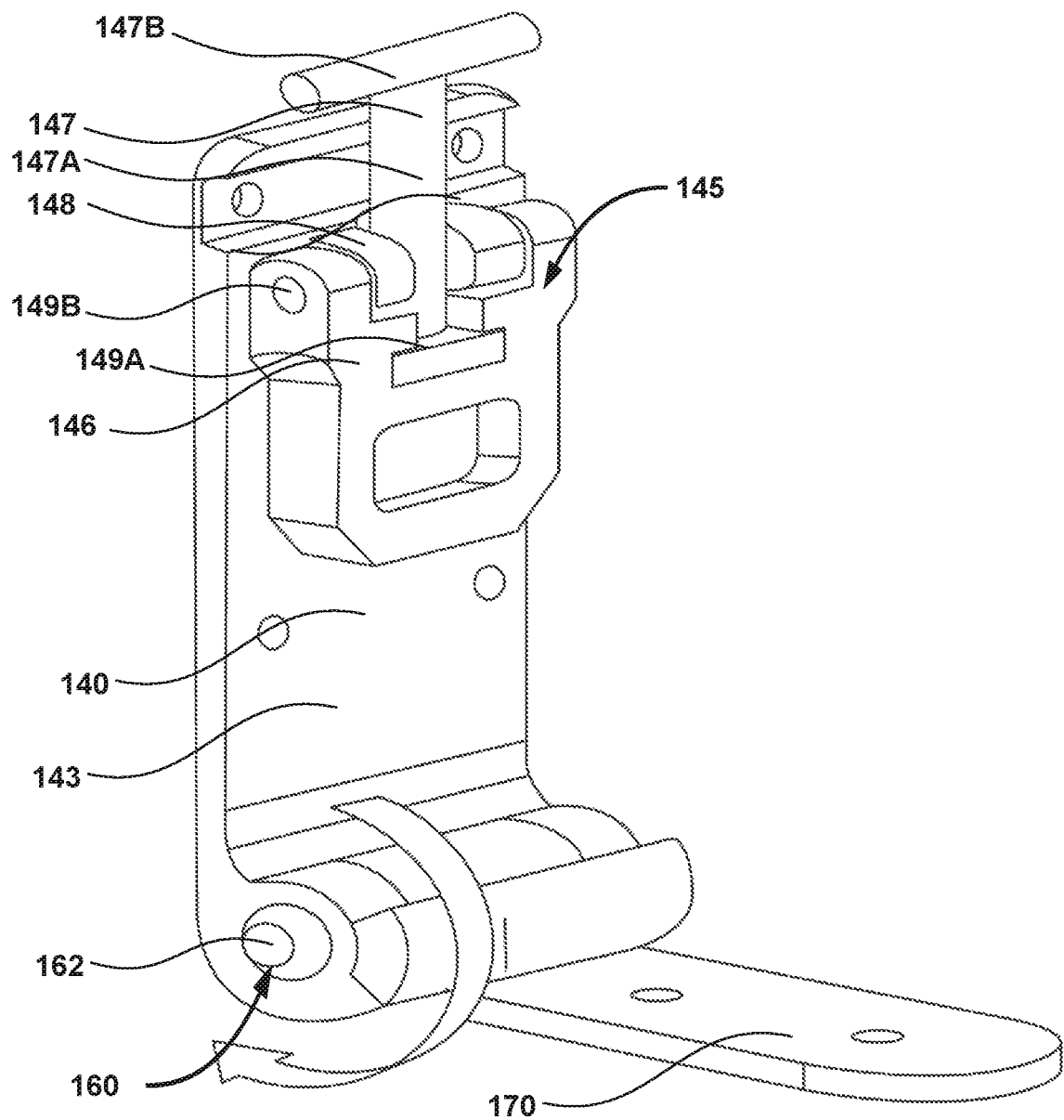
FIG. 8 illustrates a perspective view of a lever arm and a hinge arm, wherein lever arm is pivotally connected to the hinge arm, according to an embodiment of the present invention.

FIG. 8 illustrates a hinge arm 170 rotatably connected to a lever arm 143 by using a pivoting means 160. The pivoting means 160 comprises an axle bolt 162 that allows rotation of the hinge arm 170 relative to the lever arm 143 in the predefined angular range of rotational movement. Further, the pivoting means 160 comprises an O ring (not shown) to provide frictional force that acts in opposite direction to the force applied on the hinge arm 170 by the user. Further, the pivoting means 160 comprises an angle stop face (not shown) to limit the angular range of rotational movement of the hinge arm 170 relative to the lever arm 143. In an embodiment, the predefined angular range of rotational movement of the hinge arm 170 relative to the lever arm 143 is 0 degrees to 90 degrees. Further, it should be obvious to the one skilled in the art that the hinge arm 170 could be rotatably positioned in between 0 to 90 degrees relative to the lever arm 143. For instance, the hinge arm 170 could be rotatably positioned at angle of 30 degrees relative to the lever arm 143.

In another embodiment, the predefined angular range of rotational movement of the hinge arm 170 relative to the lever arm 143 is 0 degree to 180 degrees.

Further, the lever arm 143 comprises a connector arrangement 145 that removably connects the lever arm 143 to the vehicle rack 120. The connector arrangement 145 comprises a lever 146, T bar 147, a rubber bumper 148, a pivot bolt 149A and a pivot pin 149B. The lever 146 is disposed in a slot 151 (FIG. 9B) of the wing board 150 and the lever 146 is rotatably connected to the T bar 143 by using the pivot bolt 149A. Further, the lever 146 is rotatably connected to the lever arm 143 by using the pivot pin 149B. The steps/procedure for connecting the lever arm 143 and/or wing board 150 to the vehicle rack 120 will be described in greater detail in the below description (FIG. 9A-FIG. 9D).

FIGS. 9A-FIG. 9D illustrate a method/procedure of connecting the lever arm 143 and/or wing board 150 to the vehicle rack 120. As shown in FIG. 9A, the T bar 147 comprises an elongate part 147A and a small part 147B. The elongate part 147A and a small part 147B are integrally formed and are perpendicular relative to one other, thereby achieving T shape of T bar 147. In FIG. 9A, the elongate part 147A of the T Bar 147 is movably disposed in the rubber bumper 148 and the lever 146 is disposed in the slot 151 of the wing board 150 and the multipurpose vehicle 100 is operated in the side loader mode (FIG. 1) or the compact mode (FIG. 4). Further, In FIG. 9A, the handle 190 (FIG. 1-FIG. 7) is operated in low positional setting (low mode). When the handle 190 (FIG. 1-FIG. 7) is operated in high positional setting (high mode), then the user lifts the T Bar 147 by rotating the lever 146 using pivot pin 149B and/or pivot bolt 149A as seen in FIG. 9B such that the elongate part 147A of the T bar 147 moves out from the rubber bumper 148 and the lever 146 comes out from the slot 151 of the wing board 150. Afterwards, the small part 147B of the T Bar 147 is inserted in the T bar slot 122 as shown in FIG. 9C. Afterwards, the lever 146 is rotated such that the lever 146 moves in the slot 151 of the wing board 150 and the elongate part 147A of the T Bar 147 moves in the rubber bumper 148 as shown in FIG. 9D. Afterwards, the user can select the flat bed mode (FIG. 7) or carry on mode (FIG. 5) depending on his/her requirements.

By merely reversing the above steps with little or no variation, the lever arm 143 and/or wing board 150 can be disconnected from the vehicle rack 120 with simplicity.

FIG. 10 illustrates a vertical parking mode of the multipurpose vehicle 100. The pair of stand-up wheels 124 of the vehicle rack 120 and the stand up feet portion 112 of the vehicle frame 110 enables vertical parking of the multipurpose vehicle 110 on a ground surface 200. As shown in FIG. 10, the multipurpose vehicle 110 is vertically parked on the ground surface 200 in the side loader mode. However, it is obvious to the one skilled in the art that the multipurpose vehicle 110 could be vertically parked on the ground surface 200 in other modes also wherein other modes include carry on mode, compact mode and flatbed mode. While the arrangement illustrated in FIG. 10 is effective in accordance with the present invention, the multipurpose vehicle 100 is uniquely designed so that it can be vertically parked on a ground surface 200.

In another embodiment (not shown in figures), the multipurpose vehicle 100 comprises a single wingboard 150 and a single side board 180. The single wingboard 150 and a single side board 180 are disposed on only one side (i.e. left side or right side) of the frame 110.

The multipurpose vehicle 100 according to various embodiments (FIG. 1 to FIG. 10) of the present invention comprises four swing arms 140, four lever arms 143, four hinge arms 170, two connector portions 130, two side boards 180, four connection arrangements 145, two wing boards 150 and one handle 190. The left side and the opposite right side of the vehicle frame 110 are identical and comprise similar parts/components. Further, the number of the parts and/or components of the multipurpose vehicle 100 can vary and will depend on user requirements.

The multipurpose vehicle 100 according to various embodiments of the present invention comprises a bicycle. However, other types of vehicle comprising a vehicle rack could also be utilized such as but not limited to: a tricycle, a motor cycle, an electric vehicle, a scooter, a moped, an electric bike and/or combination thereof.

The multipurpose vehicle 100 of the present invention including various components, parts thereof may be configured in many different shapes, sizes and using different kinds of materials, including but not limited to metals, plastics, composites, Polymers, rubber, silicone and one should not construed these aspects to be a limiting factor for the invention disclosed herein.

The various components, parts of the various embodiments of multipurpose vehicle 100 of the present invention are similar and interchangeable. It is obvious to the one skilled in the art that the various components, parts of the multipurpose vehicle 100 of one embodiment of the present invention could be considered for other embodiments with little or no variation.

It should be understood according to the preceding description of the present invention that the same is susceptible to changes, modifications and adaptations, and that the said changes, modifications and adaptations fall within scope of the appended claims.

What is claimed is:

1. A vehicle (100) comprising:
   a vehicle frame (110) comprising a vehicle rack (120), and a plurality of connector portions (130);
   a plurality of swing arms (140), wherein each swing arm (140) comprises a first end (142) and an opposite second end (144), wherein the first end (142) of two swing arms (140) is rotatably connected to one of the connector portions (130) of the vehicle frame (110);
   a plurality of lever arms (143), wherein each lever arm (143) is connected to the second end (144) of a swing arm (140), wherein each lever arm (143) comprises a connector arrangement (145) for removably connecting the lever arm (143) to the vehicle racks (120);
   a plurality of wing board(s) (150) wherein each wing board (150) is connected to the two lever arms (143);
   a plurality of hinge arms (170) wherein each hinge arm (170) is rotatably connected to one of the lever arms (143) by a pivoting means (160);
   a plurality of side board(s) (180) wherein each side board (180) is connected to the two hinge arms (170);
   a handle (190) connected to one of the connector portions (130) of the vehicle frame (110); wherein the handle (190) is manually operable to enable adjustment of the rotation of at least two of the swing arms (140); and
   wherein the wing board(s) (150) and/or the side board(s) (180) of the multi-purpose vehicle (100) are configured to be positioned relative to the vehicle frame in multiple operating modes by operating at least one of the handle (190) and/or connector arrangement(s) (145).

2. A multipurpose vehicle (100) as claimed in claim 1, wherein the multipurpose vehicle (100) comprises a bicycle, a tricycle, a motor cycle, an electric vehicle, a scooter, a moped, an electric bike and/or combination thereof.

3. A multipurpose vehicle (100) as claimed in claim 1, wherein the vehicle frames (110) comprises a pair of stand up feet portion (112).

4. A multipurpose vehicle (100) as claimed in claim 1, wherein the vehicle rack (120) comprises a plurality of T bar slots (122) and/or a pair of stand up wheels (124).

5. A multipurpose vehicle (100) as claimed in claim 1, wherein the vehicle rack (120) comprises a plurality of ports (126) for removably connecting vehicle accessories.

6. A multipurpose vehicle (100) as claimed in claim 1, wherein the number of connector portions (130) is two.

7. A multipurpose vehicle (100) as claimed in claim 1, wherein the number of swing arms (140) is four.

8. A multipurpose vehicle (100) as claimed in claim 1, wherein the swing arms (140) are rotatable relative to the connector portion (130) of the vehicle frame (110) by an angle of 90 degrees.

9. A multipurpose vehicle (100) as claimed in claim 1, wherein the connector portion (130) comprises a bolt axle (132).

10. A multipurpose vehicle (100) as claimed in claim 1, wherein the connector arrangement (145) comprises a lever (146), a T bar (147), a rubber bumper (148) and a pivot bolt (149A) and a pivot pin (149B) and/or combinations thereof.

11. A multipurpose vehicle (100) as claimed in claim 1, wherein the wing board (150) comprises a plurality of elongate projections (152).

12. A multipurpose vehicle (100) as claimed in claim 1, wherein the pivoting means (160) comprises an axle bolt (162).

13. A multipurpose vehicle (100) as claimed in claim 1, wherein the side board (180) comprises a plurality of elongate slots (182).

14. A multipurpose vehicle (100) as claimed in claim 1, wherein the side board (180) comprises a plurality of cushion pads.

15. A multipurpose vehicle (100) as claimed in claim 1, wherein the side board (180) is rotatable relative to the wing board (150) by an angle of 90 degrees.

16. A multipurpose vehicle (100) as claimed in claim 1, wherein the handle (190) comprises a lever handle, a knob, a twist handle, a pull push button, a manual switch and/or combination thereof.

17. A multipurpose vehicle (100) as claimed in claim 1, wherein the multiple operating modes of the multi-purpose vehicle (100) are: compact mode, side loader mode, carry on mode and flat bed mode.

\* \* \* \* \*